(12) United States Patent
Hollar

(10) Patent No.: US 6,465,032 B1
(45) Date of Patent: Oct. 15, 2002

(54) METHOD OF FORMING A RECONSTITUTED COMPOSITION CONTAINING PROTEIN AND CARBOHYDRATE AT ELEVATED TOTAL SOLIDS CONTENT

(75) Inventor: Carol M. Hollar, Marietta, PA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 09/550,715

(22) Filed: Apr. 17, 2000

(51) Int. Cl.[7] .............................. A23C 9/16; A23L 1/00
(52) U.S. Cl. ....................... 426/506; 426/519; 426/520; 426/588; 426/656; 426/658
(58) Field of Search .................. 426/660, 519, 426/520, 588, 569, 506, 800, 801, 658, 656

(56) References Cited

U.S. PATENT DOCUMENTS

| | | | |
|---|---|---|---|
| 3,816,427 A | | 6/1974 | Löliger et al. |
| 4,097,616 A | * | 6/1978 | Guillou ................. 426/548 |
| 4,397,927 A | * | 8/1983 | Brog ..................... 426/583 |
| 4,582,709 A | * | 4/1986 | Peter et al. ............. 426/74 |
| 4,746,527 A | * | 5/1988 | Kuypers ................. 426/569 |
| 5,304,389 A | * | 4/1994 | Kondo et al. ............ 426/659 |
| 5,904,948 A | * | 5/1999 | Sartorio et al. ......... 426/594 |
| 6,156,320 A | * | 12/2000 | Izvekova et al. ........ 424/197.11 |
| 6,207,203 B1 | * | 3/2001 | Atkinson et al. ........ 426/73 |

FOREIGN PATENT DOCUMENTS

| | | |
|---|---|---|
| FR | 2780617 | 1/2000 |
| RU | 2102897 | 1/1998 |

OTHER PUBLICATIONS

Z. Zbikowski, et al., "Studies on Reconstitution of Milk From Milk Powder Depending on Water Temperature," Acta Alimentaria Polonica vol. XV (XXX IX), No. 3 (1989).

A.J. Baldwin, et al., "The Dispersibility of Skim Milk Powder at High Total Solids," N.Z. J1 Dairy Sci. Tech., 9, 140 (1974).

* cited by examiner

*Primary Examiner*—Nina Bhat
(74) *Attorney, Agent, or Firm*—Fitzpatrick, Cella, Harper & Scinto

(57) ABSTRACT

Methods of forming reconstituted compositions containing protein and carbohydrate at elevated total solids content are disclosed. The methods of the present invention may be used in the production of confectionery.

13 Claims, No Drawings

METHOD OF FORMING A RECONSTITUTED COMPOSITION CONTAINING PROTEIN AND CARBOHYDRATE AT ELEVATED TOTAL SOLIDS CONTENT

BACKGROUND OF THE INVENTION

1. Field of the Invention

The present invention relates to reconstituting compositions containing carbohydrates and proteins. Specifically, the invention is directed to reconstituting protein- and carbohydrate-containing compositions at a higher non-fat solids content than has heretofore been practiced in the art.

2. Description of Related Art

It is known to reconstitute milk products from powdered milk products. Generally, reconstituted milk, like milk itself, contains about 12% solids. In the confectionary field, it is also known that certain products require liquid mixtures of carbohydrates and proteins. Non-limiting examples of products requiring such mixtures include: caramel, texturized caramel, and dulce de leche, all of which require a mixture comprising at least milk and sucrose. Liquid mixtures of carbohydrate and proteins are sometimes also used in chocolate making. Generally, these mixtures are provided pre-mixed, for example as sweetened condensed milk.

The functionality required of these carbohydrate- and protein-containing compositions has become very demanding. The consumer demands a smooth, non-grainy texture in a caramel. Improperly hydrated protein can cause a grainy texture in a caramel product. Likewise, proteins that are too denatured can cause graininess in a finished confection.

According to one prior art method of reconstituting a protein and carbohydrate-containing composition, skim milk powder is reconstituted at about 43% total solids. Sugar and fat are then added to obtain a sweetened reconstituted milk having a solids content around 72%, the sweetened reconstituted milk is then evaporated to yield a composition having a total solids content of around 74%. A. J. Baldwin, et al., "The Dispersibility of Skim Milk Powder at High Total Solids," *New Zealand Journal of Dairy Science and Technology*, Vol. 9, No. 4 (1974) describes factors affecting the dispersibility of milk powder within the context of the above-described process. The resulting composition has significant amounts of fat. Fat does not require water for hydration (like milk powder), or to dissolve (like sugar). Thus, it is relatively easier to make a composition having a solids content in the range of 72% if a significant portion of the solids comes from fat.

U.S. Pat. No. 3,816,427 discloses an apparatus for continuously dissolving pulverulent material in a liquid. The patent discloses an example in which milk powder and sugar are dissolved simultaneously to obtain sweetened condensed milk purportedly having 72.68% "dry matter" content. The disclosed apparatus is specialized, and apparently requires excessive solids handling. Moreover, at least about 7.09% of the composition is added fat. The non-fat solids content of the compositions disclosed is less than about 66%.

SUMMARY OF THE INVENTION

This invention is directed to a method of forming a reconstituted high-solids composition containing carbohydrate and protein. The method comprises the steps of providing a liquid carbohydrate composition, most preferably a mixture of sucrose and water, having a solids content greater than about 55% by weight of the liquid carbohydrate composition, adjusting the temperature of said liquid carbohydrate composition to between about 45° C. and about 75° C., and mixing a powdered proteinaceous composition and the liquid carbohydrate composition with high shear to obtain a reconstituted composition containing between about 65 to about 80 weight percent solids. In a preferred embodiment, the process according to the invention comprises forming a reconstituted composition containing protein and carbohydrate at a total solids level greater than about 72 weight percent. In a more preferred embodiment, the solids content of the reconstituted composition is greater than about 66 weight percent, wherein less than about 6 weight of percent of the composition is fat. In a most preferred embodiment, the solids content of the reconstituted composition is greater than about 70 weight percent, wherein less than about 6 weight percent of the composition is fat.

In another aspect of the invention, the process comprises forming a reconstituted composition containing protein and carbohydrate at a total non-fat solids level greater than about 70 weight percent.

In another aspect of the invention, the proteinaceous composition is skim milk powder which is hydrated at a "hydration solids content" greater than about 50%, to achieve a composition having an overall solids content of greater than about 70% and a fat content less than about 6%. "Hydration solids content" is defined to mean the amount of solids to be hydrated with respect to that amount of solids plus the water available for hydration. For example, if a composition is reconstituted with milk powder, the "hydration solids content" is obtained looking only at the milk powder and the water used to hydrate it. The present invention obviates the need to remove water to arrive at a target solids content suitable for the above-mentioned end uses. The method of forming a reconstituted composition containing carbohydrate and protein at elevated total solids according to the invention provides greater process flexibility in the preparation of various confectionery.

DETAILED DESCRIPTION OF THE PREFERRED EMBODIMENTS

The methods of the present invention provide mixtures of carbohydrate and protein which are prepared from at least one liquid carbohydrate composition and at least one powdered proteinaceous composition. The liquid carbohydrate composition is a combination of water and at least one carbohydrate and does not contain substantial amounts of protein. The carbohydrate of the liquid carbohydrate composition is not limited and may include sucrose, dextrose, lactose, corn syrup solids, high fructose corn syrup, maltodextrin, or other sweeteners. Preferably, the carbohydrate composition consists essentially of water and one or more carbohydrates. Preferably, the carbohydrate is sucrose, lactose, dextrose, or a combination thereof. The powdered proteinaceous composition is not particularly limited and may be, for example, skim or whole milk powder, milk protein concentrate, whey powder, caseinates, or a powder comprising soy, wheat, or egg proteins. Preferably, the proteinaceous composition according to the invention is a milk product. Most preferably, the proteinaceous composition is skim milk powder.

In a preferred embodiment, the high-solids composition reconstituted according to the present method contains sucrose, skim milk powder and water. In another preferred embodiment, the composition used with the invention contains sucrose, lactose, dextrose, skim milk powder and water. In still another preferred formulation, the composition used with the present method comprises skim milk powder, sucrose, lactose, fat, and water.

Exemplary formulations for use with the present invention are summarized in Table 1 below.

TABLE 1

| ingredient | weight percent | | | |
| --- | --- | --- | --- | --- |
| skim milk powder | 30.4 | 19.4 | 17.1 | 16.5 |
| sucrose | 43.8 | 41.5 | 36.0 | 38.7 |
| lactose | | 4.6 | 4.3 | 4.2 |
| dextrose | | | | 16.2 |
| anhydrous milk fat | | 8.3 | 7.2 | |
| butter | | | 11.0 | |
| added water | 25.8 | 26.3 | 24.4 | 24.6 |
| solids content | 73.0 | 72.92 | 73.0 | 73.48 |
| fat content | 0.2 | 8.4 | 16.1 | 0.1 |

The reconstituted compositions formulated in accordance with the invention generally contain greater than about 65% total solids content, more preferably the reconstituted compositions contain greater than about 70% and up to about 80% total solids. Most preferably, the reconstituted compositions formulated in accordance with the invention contain about 73% total solids, without the need to remove water by evaporation.

The step of providing a liquid carbohydrate composition is not particularly limited provided that the liquid carbohydrate has a solids content greater than about 55 weight percent. Specifically, the step of providing a liquid carbohydrate composition may comprise starting with water and adding carbohydrates in any order. Alternatively, the liquid carbohydrate may be provided pre-mixed, for example, as liquid sucrose.

In a preferred embodiment according to the present invention, the step of providing a liquid carbohydrate composition comprises starting with liquid sucrose having 65 to 70° Brix (i.e. 65 to 70 weight percent solids content). The liquid sucrose is diluted with water and subjected to agitation, at a temperature between about 4° C. and about 100° C., preferably between about 50 and about 90° C., and most preferably at about 60° C. to about 65° C. The starting material may be recirculated through a heat exchanger during this dilution stage to maintain the desired temperature. At the completion of the dilution stage, the diluted starting material contains about 55% to about 65% by weight solids content. At this stage, the starting material comprises about 60 to about 70 weight percent of the final reconstituted composition.

In embodiments wherein a dilution stage is included in the step of providing a liquid carbohydrate composition, additional carbohydrate may optionally be added to the diluted starting material. The additional carbohydrates may be, for example, more sucrose, corn syrup solids, maltodextrin, dextrose, lactose, or a combination thereof. A preferred additional carbohydrate is lactose, or a mixture of lactose and dextrose. Preferably, the added carbohydrate comprises up to about 21% of the reconstituted product, more preferably, between about 4% and about 21% by weight of the reconstituted product. If additional carbohydrate is added, ingredients present at this stage comprise between about 64% and about 84% by weight of the reconstituted product.

Surprisingly, the inventors herein have found that there is sufficient water in a liquid carbohydrate mixture having this amount of solids to hydrate skim milk powder as described below and to obtain a protein and carbohydrate composition containing greater than about 70% solids.

After a liquid carbohydrate composition has been provided, the temperature is adjusted to between about 45° C. to about 75° C. and preferably to between about 55° C. to about 65° C., while agitation is maintained, with optional recirculation through a heat exchanger to maintain the desired temperature. Although temperatures in the range of about 45° C. to about 75° C. may be practical, at temperatures lower than about 55° C. protein hydration may not be accomplished in a reasonable time period (i.e. in a 10 to 15 minutes mix). At temperatures greater than about 70° C. the proteins begin to break down. Thus, a most preferred temperature for the addition of the powdered proteinaceous composition is between about 55° C. and about 65° C.

When the temperature of the liquid carbohydrate mixture has equilibrated at the appropriate temperature, proteinaceous-powder is added and the mixture is agitated at high shear. The amount of proteinaceous composition added at this stage may vary between about 14 and 35 weight percent, with respect to the final reconstituted composition. Most preferably, the proteinaceous composition is skim milk powder added in an amount between about 16 and about 31 weight percent with respect to the final reconstituted composition. As with the dilution stage, the agitation may be conducted with recirculation through a heat exchanger, and/or an in-line high shear mixer.

The proteinaceous composition is mixed with the liquid carbohydrate at high shear. Failure to mix properly at this stage can result in inadequate hydration of the protein, and a resulting grainy texture in a finished confection made from the reconstituted composition. Suitable agitation can be obtained, for example, by operating an Admix Rotosolver® impeller mixer at 1190 rpm. However, the selection and operation of a suitable high shear mixer would be apparent to one of ordinary skill in the art.

Fat, including without limitation, butter, anhydrous milk fat, butter oil, vegetable oil, and hydrogenated vegetable oil, may be added before, during, or after the step of adding a proteinaceous composition. In a preferred embodiment, fat is added after the proteinaceous composition has been added and mixed with the liquid carbohydrate mixture at high shear. Fat added in this stage is referred to herein as "added fat." The ordinarily skilled artisan will recognize that even skim milk contains a certain amount of fat, which is not included in the definition of "added fat." Up to about 17 weight percent added fat, with respect to the final reconstituted composition may be added at this stage.

Fat does not require water to disperse, but consists primarily of solids. Thus, the addition of fats permits raising the solids content of the reconstituted composition without additional water. One aspect of the invention is that the non-fat solids content of the reconstituted composition is greater than about 55 weight percent, and in preferred embodiments greater than about 66 weight percent; in more preferred embodiments, greater than about 70 weight percent, and even greater than about 72 weight percent. Fat may be added to a composition reconstituted at such non-fat solids content, as described above, which will increase the overall solids content of the final reconstituted composition.

After the fat is added, the fat, protein, and carbohydrate mixture is subjected to high shear again for a period of between 5 and about 120 minutes, preferably between about 10 and about 20 minutes.

When the reconstituted composition has been completely formed and mixed, the batch is discharged through a filter and, if desired, cooled prior to storage. Optionally, an in-line high shear mixer may be provided on the discharge line. Preferably, the filter has a mesh below about 2 mm. Most preferably the filter has a 1.5 mm mesh.

The following are non-limiting examples according to the invention.

EXAMPLE 1

To obtain an output of 3700 kg of sweetened condensed skim milk with 73.00% dry matter content, 2380 kg of liquid sucrose (68.1° Brix) and 195 kg water are mixed together at 60±5° C. With high shear agitation, 1126 kg skim milk powder having 96% dry matter content is added to the process vessel. The sweetened condensed skim milk is mixed with high shear agitation for at least 15 minutes at 60±52° C. prior to discharge. The resulting sweetened condensed milk has a solids content of 73.0% by weight, and a fat content of 0.2% by weight.

EXAMPLE 2

To obtain an output of 3700 kg of sweetened condensed skim milk with 73.48% dry matter content, 2103 kg of liquid sucrose (68.1° Brix), 599 kg dextrose monohydrate having 91.4% dry matter content, 155 kg lactose monohydrate having 99.5% dry matter content, and 234 kg water are mixed together at 60±5° C. With high shear agitation, 610 kg skim milk powder having 96% dry matter content is added to the process vessel. The sweetened condensed skim milk is mixed with high shear agitation for at least 15 minutes at 60±5° C. prior to discharge. The resulting sweetened condensed milk has a solids content of 73.48% by weight, and a fat content of 0.1% by weight.

EXAMPLE 3

To obtain an output of 3700 kg of sweetened condensed whole milk with 72.92% dry matter content, 2275 kg of liquid sucrose (67.5° Brix), 168 kg lactose monohydrate having 99.5% dry matter content, and 234 kg water are mixed together at 60±5° C. With high shear agitation, 717 kg skim milk powder having 96% dry matter content and 306 kg anhydrous milk fat is added to the process vessel. The sweetened condensed whole milk is mixed with high shear agitation for at least 15 minutes at 60±5° C. prior to discharge. The resulting sweetened condensed milk has a solids content of 72.92% by weight, and a fat content of 8.4% by weight.

Obvious variations of the disclosed method within the scope of the appended claims will be apparent to those of ordinary skill of the art.

What is claimed is:

1. A method of forming a reconstituted high-solids composition containing carbohydrate and protein comprising the steps of:
   (a) providing a liquid carbohydrate composition having a solids content greater than about 55 percent;
   (b) adjusting the temperature of said liquid carbohydrate composition to between about 45° C. and about 75° C.; and
   (c) mixing a powdered proteinaceous composition and the liquid carbohydrate composition under high shear to obtain a reconstituted composition containing between about 65 and 80 weight percent solids.

2. A method according to claim 1, wherein said liquid carbohydrate composition consists essentially of sucrose, lactose, or dextrose, or a mixture thereof; and water.

3. A method according to claim 1 wherein said reconstituted composition contains greater than about 70 weight percent non-fat solids.

4. A method according to claim 1, wherein said reconstituted composition contains greater than about 72 weight percent solids and less than about 6 weight percent fats.

5. A method according to claim 1, wherein said step of adjusting the temperature of said liquid carbohydrate comprises adjusting the temperature to between about 55° C. and about 65° C.

6. A method according to claim 5, wherein said step of adjusting the temperature is conducted with agitation and recirculation.

7. A method according to claim 1, wherein said reconstituted composition comprises between about 14 and about 31 weight percent of said proteinaceous composition.

8. A method according to claim 1, wherein said step of providing a liquid carbohydrate composition comprises diluting a liquid sucrose starting composition having a solids content greater than about 65 weight percent with water under agitation to obtain a dilute liquid sucrose composition having a solids content between about 55 and 65 weight percent, and adding additional carbohydrates, said additional carbohydrates comprising between about 4 weight percent and about 20 weight percent of said reconstituted composition to said dilute liquid sucrose composition.

9. A method according to claim 8, wherein said additional carbohydrates comprises a mixture of lactose and dextrose.

10. A method according to claim 1, further comprising adding a fat to said liquid carbohydrate composition during said steps (a), (b), or (c), or after said step (c).

11. A method according to claim 1 wherein said proteinaceous composition consists essentially of skim milk powder.

12. A method of forming a reconstituted high-solids composition containing carbohydrate and protein comprising the steps of:
   (a) providing a liquid sucrose composition having a solids content between about 65 and 70 percent;
   (b) diluting said liquid sucrose composition to obtain a diluted liquid sucrose composition;
   (c) adding additional carbohydrate selected from lactose, dextrose and combinations thereof to said diluted liquid sucrose composition, said additional carbohydrate comprising between about 4 weight percent and about 20 weight percent of said reconstituted composition, to obtain a liquid carbohydrate composition;
   (d) adjusting the temperature of said liquid carbohydrate composition with agitation, to between 25 about 55° C. and about 65° C.; and
   (e) mixing skim milk powder and the liquid carbohydrate composition under high shear to obtain a reconstituted composition containing greater than about 70 weight percent solids and having less than about 2 weight percent fat.

13. A method of forming a reconstituted high-solids composition containing carbohydrate and protein, comprising the steps of hydrating skim milk powder at a hydration solids content of greater than about 50% to obtain the reconstituted composition having a solids content greater than about 72% and a fat content less than about 6%.

* * * * *

UNITED STATES PATENT AND TRADEMARK OFFICE
CERTIFICATE OF CORRECTION

PATENT NO. : 6,465,032 B1
DATED : October 15, 2002
INVENTOR(S) : Carol M. Hollar It is certified that error appears in the above-identified patent and that said Letters Patent is hereby corrected as shown below:

Column 6,
Line 52, "25" should be deleted.

Signed and Sealed this

Twenty-third Day of September, 2003

JAMES E. ROGAN
*Director of the United States Patent and Trademark Office*